United States Patent
Niewiadomski et al.

(10) Patent No.: US 12,024,207 B2
(45) Date of Patent: Jul. 2, 2024

(54) VEHICLE AUTONOMOUS MODE OPERATING PARAMETERS

(71) Applicant: Ford Global Technologies, LLC, Dearborn, MI (US)

(72) Inventors: Luke Niewiadomski, Dearborn, MI (US); Austin Moore, Grosse Pointe Woods, MI (US); Gangarjun Veeramurthy, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 17/201,235

(22) Filed: Mar. 15, 2021

(65) Prior Publication Data

US 2022/0289248 A1 Sep. 15, 2022

(51) Int. Cl.
*B60W 60/00* (2020.01)
*B60K 35/00* (2006.01)
(Continued)

(52) U.S. Cl.
CPC ......... *B60W 60/0053* (2020.02); *B60K 35/00* (2013.01); *B60W 40/02* (2013.01);
(Continued)

(58) Field of Classification Search
CPC ............ B60K 35/00; B60K 2370/1438; B60K 2370/152; B60K 2370/172; B60K 2370/175; B60W 60/0053; B60W 40/02; B60W 50/0097; B60W 50/082; B60W 2050/0073; B60W 2555/20; B60W 2540/10; B60W 2540/12; B60W 50/0098; B60W 60/001; B60W 2050/0088; B60W 2540/18; B60W 2556/10; B60W 60/00–60/007; G06N 20/00; G06N 3/0464; G06N 3/084; G06N 3/09; G05D 1/00–1/12
(Continued)

(56) References Cited

U.S. PATENT DOCUMENTS 10,589,751 B2 3/2020 Nagy et al.
2014/0200788 A1* 7/2014 Eriksson ................ B60K 26/00
701/93
(Continued)

FOREIGN PATENT DOCUMENTS

DE 102016211646 A1 12/2017

*Primary Examiner* — Mohamed Abdo Algehaim
(74) *Attorney, Agent, or Firm* — Frank A. MacKenzie; Bejin Bieneman PLC

(57) ABSTRACT

While an autonomous mode is activated, a vehicle is operated based on operating parameters for the autonomous mode. The operating parameters include at least one of a vehicle speed or a following distance. Upon detecting a user input to control vehicle operation, vehicle operation is transitioned to a nonautonomous mode, and a count of a number of received user inputs to control vehicle operation is incremented. Upon determining that the count of received of user inputs to control vehicle operation is greater than a threshold, the operating parameters for the autonomous mode are updated. Then, upon determining to transition from the nonautonomous mode to the autonomous mode, the vehicle is operated based on the updated operating parameters.

14 Claims, 7 Drawing Sheets

(51) Int. Cl.
  *B60K 35/10* (2024.01)
  *B60K 35/22* (2024.01)
  *B60K 35/28* (2024.01)
  *B60W 40/02* (2006.01)
  *B60W 50/00* (2006.01)
  *B60W 50/08* (2020.01)
  *G06N 20/00* (2019.01)

(52) U.S. Cl.
  CPC ...... *B60W 50/0097* (2013.01); *B60W 50/082* (2013.01); *G06N 20/00* (2019.01); *B60K 35/10* (2024.01); *B60K 35/22* (2024.01); *B60K 35/28* (2024.01); *B60K 2360/1438* (2024.01); *B60K 2360/172* (2024.01); *B60K 2360/175* (2024.01); *B60W 2050/0073* (2013.01); *B60W 2555/20* (2020.02)

(58) Field of Classification Search
  USPC .......................................................... 701/23
  See application file for complete search history.

(56) References Cited

U.S. PATENT DOCUMENTS

| | | | |
|---|---|---|---|
| 2015/0025731 A1* | 1/2015 | Uehara | B60W 50/14 701/23 |
| 2016/0312885 A1* | 10/2016 | Kuwahara | F16H 61/0437 |
| 2016/0339915 A1* | 11/2016 | Kuwahara | B60W 50/10 |
| 2017/0057520 A1* | 3/2017 | Letwin | B60W 60/005 |
| 2017/0080948 A1* | 3/2017 | Lubbers | B60W 50/14 |
| 2017/0113664 A1* | 4/2017 | Nix | G06V 20/56 |
| 2017/0227959 A1* | 8/2017 | Lauffer | B60W 50/0098 |
| 2018/0093676 A1* | 4/2018 | Emura | G05D 1/0257 |
| 2018/0141568 A1* | 5/2018 | Singhal | G01S 13/865 |
| 2018/0194349 A1* | 7/2018 | McGill, Jr. | B60W 60/0013 |
| 2018/0239352 A1* | 8/2018 | Wang | B60W 60/0053 |
| 2018/0374002 A1* | 12/2018 | Li | G06Q 10/02 |
| 2019/0009794 A1* | 1/2019 | Toyoda | B60W 50/12 |
| 2019/0047584 A1* | 2/2019 | Donnelly | B60W 30/025 |
| 2019/0064800 A1* | 2/2019 | Frazzoli | G06V 20/597 |
| 2019/0064804 A1* | 2/2019 | Frazzoli | B60W 60/0011 |
| 2019/0199799 A1* | 6/2019 | Asher | B60R 16/037 |
| 2019/0270458 A1* | 9/2019 | Shimotani | G06F 3/04883 |
| 2019/0310627 A1 | 10/2019 | Halder | |
| 2019/0344797 A1 | 11/2019 | Palanisamy et al. | |
| 2019/0344798 A1* | 11/2019 | Motomura | G05D 1/0061 |
| 2020/0027354 A1* | 1/2020 | Goldman | G07C 5/008 |
| 2020/0031334 A1* | 1/2020 | Woodley | B60T 8/1761 |
| 2020/0167575 A1* | 5/2020 | Nayak | G06N 20/00 |
| 2020/0238998 A1* | 7/2020 | Dasalukunte | G08G 1/0969 |
| 2020/0247414 A1* | 8/2020 | Ishioka | B60W 50/14 |
| 2020/0283025 A1* | 9/2020 | Honda | B60W 60/0025 |
| 2020/0301428 A1* | 9/2020 | Tosaki | B60W 50/14 |
| 2020/0406894 A1* | 12/2020 | Akella | B60K 31/0066 |
| 2021/0046946 A1* | 2/2021 | Nemec | B60W 50/10 |
| 2021/0061299 A1* | 3/2021 | Wang | B60W 60/0053 |
| 2021/0094577 A1* | 4/2021 | Shalev-Shwartz | B60W 30/0953 |
| 2021/0129840 A1* | 5/2021 | Zhang | B60W 10/04 |
| 2021/0237739 A1* | 8/2021 | Hayakawa | B60W 30/18163 |
| 2021/0407319 A1* | 12/2021 | Urano | B60W 60/0059 |
| 2022/0009512 A1* | 1/2022 | Urano | B60W 40/09 |
| 2022/0009524 A1* | 1/2022 | Oba | B60W 60/0061 |
| 2022/0063649 A1* | 3/2022 | Takabatake | B60W 60/0057 |
| 2022/0234603 A1* | 7/2022 | Mujumdar | B60W 10/20 |
| 2022/0274603 A1* | 9/2022 | Karve | G06N 3/047 |
| 2022/0283579 A1* | 9/2022 | Hu | G05D 1/0011 |
| 2022/0297716 A1* | 9/2022 | Li | B62D 15/0285 |
| 2023/0019968 A1* | 1/2023 | Zhang | G01C 21/3415 |
| 2023/0060300 A1* | 3/2023 | Rosenbaum | B60W 50/06 |
| 2023/0084461 A1* | 3/2023 | Koehler | B60W 60/001 |

\* cited by examiner

VEHICLE AUTONOMOUS MODE OPERATING PARAMETERS

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. For example, a vehicle speed can be set and maintained according to user input and/or based on a speed and/or relative position of a reference vehicle, typically an immediately preceding vehicle.

DETAILED DESCRIPTION

Figure 1:
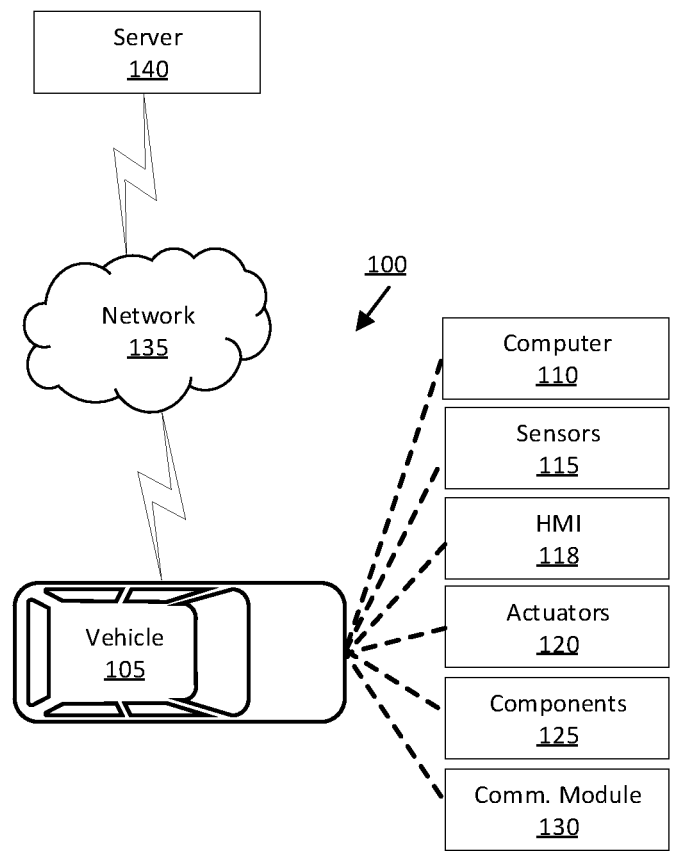
FIG. 1 is a block diagram illustrating an example vehicle control system for a vehicle.

A vehicle computer can operate a vehicle in an autonomous mode. As used herein, an "autonomous mode" is an operating mode that satisfies levels 2-5 for autonomous operation as defined by SAE. In the autonomous mode, the vehicle computer can generate a planned path for the vehicle and can control a propulsion, braking, and steering of the vehicle to operate the vehicle along the planned path. The vehicle computer can operate the vehicle based on operating parameters for the autonomous mode. Typically, the vehicle computer requests a user to specify operating parameters for certain environmental conditions. However, the vehicle computer may lack computational resources to identify all possible environmental conditions, which can result in the vehicle computer operating the vehicle in an undesired manner in certain environmental conditions.

Advantageously, while the vehicle computer is operating the vehicle in the autonomous mode, the vehicle computer can receive a user input, e.g., via display, a braking component, a steering component, a propulsion component, etc., overriding a vehicle operation and specifying a preferred vehicle operation. The vehicle computer can then input the user input and the environmental conditions present at the time the user input was received to a machine learning program that outputs updated operating parameters for the autonomous mode, which allows the vehicle computer to determine operating parameters for the autonomous mode in various environmental conditions without having previously identified the respective environmental condition.

A system includes a computer including a processor and a memory, the memory storing instructions executable by the processor to, while an autonomous mode is activated, operate a vehicle based on operating parameters for the autonomous mode. The operating parameters include at least one of a vehicle speed or a following distance. The instructions further include instructions to, upon detecting a user input to control vehicle operation, transition to a nonautonomous mode and increment a count of a number of received user inputs to control vehicle operation. The instructions further include instructions to, upon determining that the count of received user inputs to control vehicle operation is greater than a threshold, update the operating parameters for the autonomous mode. The instructions further include instructions to then, upon determining to transition from the nonautonomous mode to the autonomous mode, operate the vehicle based on the updated operating parameters.

The instructions can further include instructions to determine the operating parameters based on operation data obtained while monitoring the vehicle in the nonautonomous mode.

The instructions can further include instructions to input the operation data to a machine learning program that outputs the operating parameters.

The instructions can further include instructions to determine the operating parameters additionally based on environmental conditions.

The instructions can further include instructions to input the operation data and the environmental conditions to a machine learning program that outputs the operating parameters.

The instructions can further include instructions to, upon determining a future updated operation based on the operating parameters, maintain vehicle operation based on receiving, within a predetermined time, a user input rejecting the future updated operation.

The instructions can further include instructions to, upon receiving the user input rejecting the future updated operation, update a display to provide a respective representation for each of a plurality of permitted operations based on environmental conditions.

The instructions can further include instructions to, upon failing to receive the user input rejecting the future updated operation within the predetermined time, operate the vehicle based on the future updated operation.

The instructions can further include instructions to, upon receiving a user input specifying a permitted operation, operate the vehicle based on the permitted operation.

The instructions can further include instructions to, upon receiving the user input specifying a permitted operation, input the user input specifying the permitted operation to a machine learning program that outputs the updated operating parameters.

The instructions can further include instructions to receive the user input via at least one of a steering component, a braking component, or a propulsion component.

The instructions to update the operating parameters can further include instructions to, upon determining that the number of user inputs is greater than the threshold, input the user input to a machine learning program that outputs the updated operating parameters.

The instructions can further include instructions to, upon determining that the number of user inputs to control vehicle operation is less than or equal to the threshold, maintain the operating parameters for the autonomous mode. The instructions can further include instructions to then, upon determining to transition from the nonautonomous mode to the autonomous mode, operate the vehicle based on the operating parameters.

The instructions can further include instructions to determine to transition to the autonomous mode based on detecting an absence of the user input to control vehicle operation for a predetermined time.

A method includes, while an autonomous mode is activated, operating a vehicle based on operating parameters for the autonomous mode. The operating parameters include at least one of a vehicle speed or a following distance. The method further includes, upon detecting a user input to control vehicle operation, transitioning to a nonautonomous mode and incrementing a count of a number of received user inputs to control vehicle operation. The method further includes, upon determining that the count of received user inputs to control vehicle operation is greater than a threshold, updating the operating parameters for the autonomous mode. The method further includes then, upon determining to transition from the nonautonomous mode to the autonomous mode, operating the vehicle based on the updated operating parameters.

The method can further include determining the operating parameters based on operation data obtained while monitoring the vehicle in the nonautonomous mode.

The method can further include, upon determining a future updated operation based on the operating parameters, maintaining vehicle operation based on receiving, within a predetermined time, a user input rejecting the future updated operation.

The method can further include, upon receiving a user input specifying a permitted operation, operating the vehicle based on the permitted operation.

The method can further include, upon determining that the number of user inputs to control vehicle operation is less than or equal to the threshold, maintaining the operating parameters for the autonomous mode. The method can further include then, upon determining to transition from the nonautonomous mode to the autonomous mode, operating the vehicle based on the operating parameters.

The method can further include determining to transition to the autonomous mode based on detecting an absence of the user input to control vehicle operation for a predetermined time.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-3B, an example vehicle control system 100 includes a vehicle 105. A vehicle computer 110 in the vehicle 105 receives data from sensors 115. The vehicle computer 110 is programmed to, while an autonomous mode is activated, operate a vehicle 105 based on operating parameters for the autonomous mode. The operating parameters include at least one of a vehicle 105 speed or a following distance. The vehicle computer 110 is further programmed to, upon detecting a user input to control vehicle operation, transition to a nonautonomous mode and increment a count of a number of received user inputs to control vehicle operation. As used herein, a "nonautonomous mode" is an operating mode that satisfies levels 0-1 for autonomous operation as defined by SAE. The vehicle computer 110 is further programmed to, upon determining that the count of received user inputs to control vehicle operation is greater than a threshold, update the operating parameters for the autonomous mode. The vehicle computer 110 is further programmed to then, upon determining to transition from the nonautonomous mode to the autonomous mode, operate the vehicle 105 based on the updated operating parameters.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode or a non-autonomous (or manual) mode, i.e., can control and/or monitor operation of the vehicle 105, including controlling and/or monitoring components 125. As set forth above, an autonomous mode is one that satisfies levels 2-5 for autonomous vehicle operation as defined by SAE, and a nonautonomous mode is one that satisfies levels 0-1 for autonomous vehicle operation as defined by SAE.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
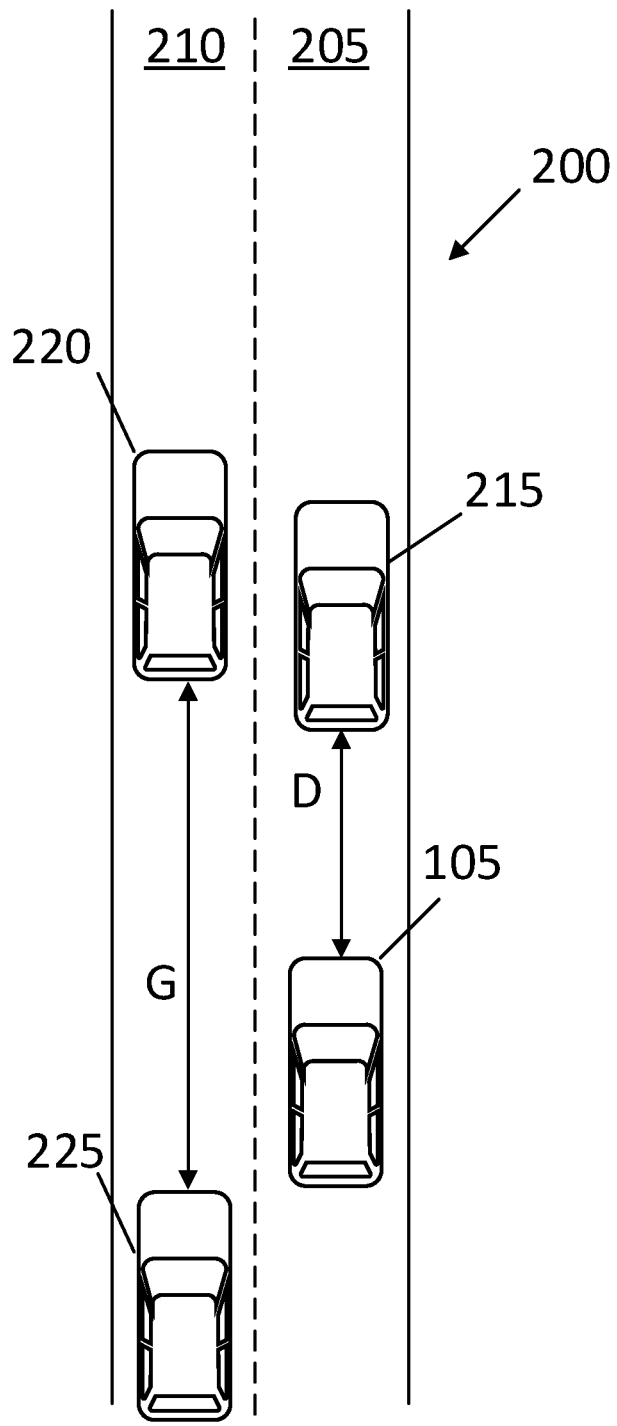
FIG. 2 is a diagram illustrating a vehicle operating in an exemplary lane of an exemplary road.

FIG. 2 is a diagram illustrating a vehicle 105 operating in a lane 205 of an example road 200. A lane is a specified area of the road for vehicle travel. A road in the present context is an area of ground surface provided for land vehicle travel. A lane of a road is an area defined along a length of a road, typically having a width to accommodate only one vehicle, i.e., such that multiple vehicles can travel in a lane one in front of the other, but not abreast of, i.e., laterally adjacent, one another.

While monitoring a vehicle 105 in the nonautonomous mode, the vehicle computer 110 can collect operation data of one or more components 125 from one or more sensors 115. In this context, "operation data" are data describing operation of the components 125. The operation data can include, e.g., speed data, acceleration data, braking data, steering angle data, etc. That is, as the user actuates components 125 to control the vehicle 105 along a road 200, the operation data describe how the vehicle 105 operates along the road 200.

The vehicle computer 110 can determine operating parameters for the autonomous mode. An operating parameter herein is a physical limit of vehicle 105 operation, i.e., an operating parameter specifies a limit of a measurement of vehicle operation and/or a measurement of an environmental condition limiting vehicle 105 operation. Put another way, an operating parameter is a limit of a measurement of a physical characteristic of a vehicle 105 or an environment around that vehicle 105 while the vehicle computer 110 is operating the vehicle 105 in the autonomous mode. A variety of operating parameters may be determined for vehicle operation in the autonomous mode. A non-limiting list of operating parameters includes a speed of the vehicle 105, a following distance D, an acceleration rate of the vehicle 105, a position of the vehicle 105 within a road 200 and/or lane 205, a gap G between vehicles 220, 225 in an adjacent lane 210 sufficient to perform a lane change operation, a number of lanes 205, 210 on a road 200, etc. For example, the vehicle computer 110 can determine operating parameters for the autonomous mode based on the operation data obtained while monitoring the vehicle 105 in the nonautonomous mode. For example, the vehicle computer 110 can input the operation data into a neural network, such as a deep neural network (DNN) 400 (see FIG. 4), that can be trained to accept operation data as input and generate an output of a determination of operating parameters for the autonomous mode.

Additionally, the vehicle computer 110 can determine operating parameters for the autonomous mode based on environmental conditions obtained while monitoring the vehicle 105 in the nonautonomous mode. For example, in addition to inputting the operation data into the DNN 400, the vehicle computer 110 can input the environmental conditions into the DNN 400 that can be trained to accept operation data and environmental conditions as input and generate an output of a determination of operating parameters for the autonomous mode. Environmental conditions in the context of this document are physical phenomena in an environment that can be measured and/or determined by the vehicle 105. That is, environmental conditions are actual physical characteristics around the vehicle 105, and operating parameters specify physical characteristics that limit vehicle 105 operation. Operating parameters may vary based on the environmental conditions around the vehicle 105. For example, the maximum speed of the vehicle 105 may be greater when an absence of precipitation is detected than when a presence of precipitation is detected. As another example, the following distance D may be greater at night, i.e., after sundown and prior to sunrise, than during the day, i.e., after sunrise and prior to sundown.

The vehicle computer 110 can be programmed to obtain data about environmental conditions around the vehicle 105, i.e., data providing measurements of phenomena outside a vehicle, i.e., in an environment around the vehicle, that is collected about operation of one or more vehicle 105 subsystems and/or components 125; vehicle environmental conditions can include location data, road data, weather data (e.g., ambient temperature, ambient light) and a time of day.

The vehicle computer 110 can receive sensor 115 data, e.g., image data, of the environment around the vehicle 105. The image data can include one or more objects around the host vehicle 105. For example, object classification or identification techniques, can be used, e.g., in the vehicle computer 110 based on lidar sensor 115, camera sensor 115, etc., data to identify a type of object, e.g., a vehicle, a bicycle, a drone, a pedestrian, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification of one or more objects or an indication that no object is present in the respective region of interest. Further, a coordinate system (e.g., polar or cartesian) applied to an area proximate to the vehicle 105 can be used to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 may, for example, identify a current road 200 of vehicle 105 operation based on map data. A road is defined by geo-coordinates for road boundaries, e.g., by geo-fencing. The vehicle computer 110 may receive the map data from the remote server computer 140, e.g., via the network 135. In such an example, the geo-fence specifies a perimeter or edges, i.e., boundaries, of the road 200 according to geo-coordinates, e.g., such as are used in the Global Positioning System (GPS) that specify lines defining boundaries, i.e., the perimeter, of the road 200. The vehicle computer 110 can then determine the vehicle 105 is on the road 200 based on the location data of the vehicle 105 indicating the vehicle 105 is within the geo-fence.

Upon identifying the current road 200 of vehicle 105 operation, the vehicle computer 110 may determine one or more characteristics of the current road, i.e., physical quantities that describe measurements and/or limitations of the road. For example, road characteristics can include a curvature, an inclination, a speed limit, number of lanes, etc. The vehicle computer 110 can, for example, determine the road characteristics based on the map data. The vehicle computer 110 can then determine a type of the current road 200 based on the characteristics of the current road 200. A type of road 200 is a classification of the road that describes expected vehicle use of the road 200. Each type of road 200 is further defined by a plurality of predefined characteristics. A road type can be identified by an identifier that describes the road type. Non-limiting examples of types of roads include: highways, freeways, expressways, service drives, side streets, off-ramps, on-ramps. The plurality of predefined characteristics for each type of road may be specified, e.g., by government regulations.

Additionally, the vehicle computer 110 can determine a traffic density for the identified road 200. Traffic density is a number of vehicles per unit distance along a length of a road, e.g., a number of vehicles per kilometer. For example, the vehicle computer 110 can receive map data that specifies the traffic density of the identified road 200 from the remote server computer 140, e.g., via the network 135.

The vehicle computer 110 may determine the weather data for the vehicle 105 location based on sensor 115 data. For example, the vehicle computer 110 can receive weather data from an external server, e.g., from a weather station, the remote server computer 140, etc. The weather data typically includes conventional measurements, e.g., ambient air temperature, ambient humidity, precipitation data, forecasts, wind speed, etc.

The vehicle computer 110 can be programmed to transition the autonomous mode from a deactivated state to an activated state based on a first user input. For example, the vehicle computer 110 may actuate the HMI 118 to detect a first user input selecting the autonomous mode. For example, the HMI 118 may be programmed to display a virtual button on a touchscreen display that the user can select to select the autonomous mode. In this situation, the HMI 118 may activate sensors 115 that can detect the user selecting the virtual button to select the autonomous mode. Upon detecting the first user input, the HMI 118 can then provide the first user input to the vehicle computer 110, and the vehicle computer 110 can activate the autonomous mode based on the first user input.

The vehicle computer 110 can operate the vehicle 105 in the autonomous mode based on the operating parameters. For example, the vehicle computer 110 can access the operating parameters, e.g., from a memory of the vehicle computer 110. The vehicle computer 110 can then actuate one or more vehicle components 125 to operate the vehicle 105 while meeting the operating parameters. That is, the vehicle computer 110 operates the vehicle 105 without violating the limits specified by the operating parameters. For example, the vehicle computer 110 can actuate vehicle components 125 to a speed and/or a following distance D from a lead vehicle 215 specified by the operating parameters. A lead vehicle 215 is a vehicle operating in front of the vehicle 105 and in a same lane 205 as the vehicle 105.

Additionally, the vehicle computer 110 can, for example, generate a planned path to operate the vehicle 105 along the road 200, e.g., in a current lane 205. Alternatively, the remote server computer 140 can generate the planned path and then provide the planned path to the vehicle computer 110, e.g., via the network 135. The vehicle computer 110 can generate the planned path based on the operating parameters. For example, the vehicle computer 110 can generate a planned path that directs the vehicle 105 along types of roads 200 specified by the operating parameters.

As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \tag{1}$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

The vehicle computer 110 can determine a future updated operation of the vehicle 105 based on the operating parameters and/or the environmental conditions. A future updated operation is an updated operation, i.e., an alteration from a current operation, that the vehicle 105 is expected to perform at a future time. For example, the vehicle computer 110 can determine to update a vehicle 105 speed and/or a following distance D from a lead vehicle 215 in front of the vehicle 105 to correspond with the operating parameters. For example, upon detecting a presence of precipitation, the vehicle computer 110 can determine to reduce the vehicle 105 speed to a speed for vehicle operation during precipitation specified by the operating parameters.

As another example, the vehicle computer 110 can determine to update the planned path to correspond with the operating parameters. For example, upon determining a speed of a lead vehicle 215 is less than the vehicle 105 speed and determining that a gap G between vehicles 220, 225 in an adjacent lane 210 is at least a threshold gap, the vehicle computer 110 can determine to direct the vehicle 105 from the current lane 205 to the adjacent lane 210, e.g., to continue operating the vehicle 105 at a speed and/or following distance D specified by the operating parameters.

The threshold gap specifies a minimum distance of free space between vehicles 220, 225 in an adjacent lane 210, such that the vehicle computer 110 can maneuver the vehicle 105 into the adjacent lane 210 and between the vehicles 220, 225 without impacting the vehicles 220, 225. The threshold gap may be determined empirically, e.g., based on a length of the vehicle 105 and a minimum distance of free space around the vehicle 105 to prevent the vehicle 105 from being impacted (e.g., based on a speed of the vehicle 105).

The vehicle computer 110 may determine the gap G based on sensor 115 data. For example, the vehicle computer 110 can employ free space computation techniques to image data that identifies a range of pixel coordinates associated with a vehicle 220 and free space (i.e., space in which no object is detected) between the vehicle 105 and the identified vehicle 220. By identifying a set of pixel coordinates in an image associated with the free space and the identified vehicle 220 and determining a distance (in pixel coordinates) from an image sensor 115 lens, e.g., across the free space, to the identified vehicle 220 pixel coordinates, the vehicle computer 110 can then determine a distance, e.g., across the free space, of the image sensor 115 lens from the identified vehicle 220. That is, according to, e.g., conventional image analysis techniques, the vehicle computer 110 can determine a distance from the lens to the identified coordinates (in pixel coordinates) and can further determine, from the image an angle between a line from the sensor 115 lens to a point on the identified vehicle 220, and an axis extending from the lens parallel to a longitudinal axis of the vehicle 105. Then, using trigonometric functions based on (i) a line extending from the sensor 115 lens to the point on the identified vehicle 215, (ii) a line extending from the sensor 115 lens along the axis, and (iii) a line that intersects the point on the identified vehicle 220 and with which the line extending along the axis forms a right angle, the vehicle computer 110 can determine a length of the line drawn parallel to the vehicle 105 longitudinal axis from (a) an axis extending from the sensor 115 lens parallel to a lateral axis of the vehicle 105 to (b) the point on the identified vehicle 220. By repeating this process for the vehicle 225 immediately behind the identified vehicle 220 and adding the lengths of two lines parallel to the vehicle 105 longitudinal axis and drawn from the axis extending from the sensor 115 lens parallel to the lateral axis of the vehicle 105 to the respective points on the vehicles, the gap G may be determined.

The vehicle computer 110 may be programmed to determine a speed of the lead vehicle 215 based on sensor 115 data. The vehicle computer 110 may determine the speed of the lead vehicle 215 relative to the vehicle 105 by determining a change in distance between the lead vehicle 215 and the vehicle 105 over time. For example, the vehicle computer 110 determine the speed of the lead vehicle 215 relative to the vehicle 105 with the formula $\Delta D/\Delta T$, where $\Delta D$ is a difference between a pair of distances from the vehicle 105 to the lead vehicle 215 (as discussed above) taken at different times and $\Delta T$ is an amount of time between when the pair of distances was determined. For example, the difference between the pair of distances $\Delta D$ may be determined by subtracting the distance determined earlier in time from the distance determined later in time. In such an example, a positive value indicates that the lead vehicle 215 is traveling slower than the vehicle 105, and a negative value indicates that the lead vehicle 215 is traveling faster than the vehicle 105. As another example, the vehicle computer 110 may receive the speed of the identified vehicle 215, e.g., via V2V communications.

Figure 3A:
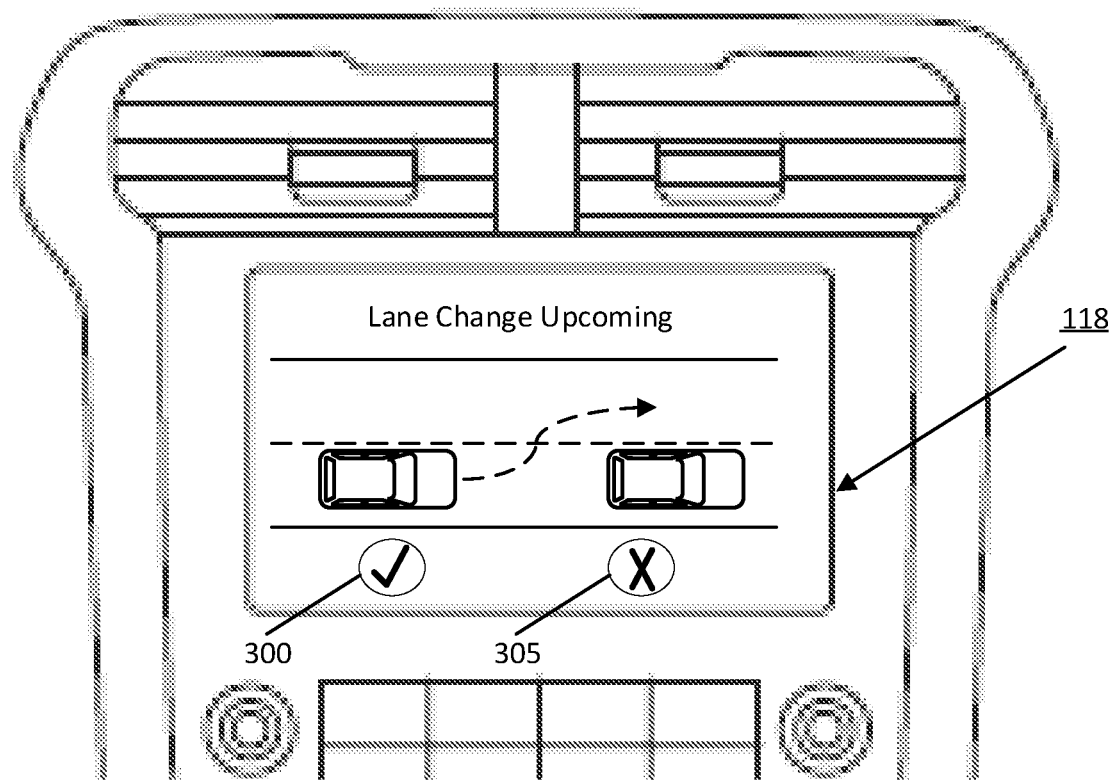
FIG. 3A is a diagram illustrating an example display representing a future updated operation.

Upon determining the future updated operation, the vehicle computer 110 can actuate the HMI 118 to display a representation of the future updated operation, as shown in FIG. 3A. For example, the HMI 118 can display a graphical image and/or a textual string that represent the future updated operation. Additionally, the HMI 118 can display a first virtual button 300 and a second virtual button 305, as shown in FIG. 3A. The HMI 118 can detect a second user input selecting one of the first virtual button 300 or the second virtual button 305, e.g., in substantially the same manner as discussed above with respect to the first user input. Upon detecting the second user input selecting one of the first virtual button 300 or the second virtual button 305, the HMI 118 can provide the user input to the vehicle computer 110.

The vehicle computer 110 can initiate a timer upon displaying the future updated operation. The timer can have a predetermined duration, e.g., 5 seconds, 10 seconds, etc. The duration can be determined based on, e.g., empirical testing to determine an amount of time needed for a user to view the display and make a selection. In the case that the vehicle computer 110 receives the second user input selecting the first virtual button 300 prior to expiration of the timer, the vehicle computer 110 can authorize the future updated operation. Upon authorizing the future updated operation, the vehicle computer 110 can operate the vehicle 105 based on the future updated operation. For example, the vehicle computer 110 can actuate one or more vehicle components 125 to perform the future updated operation.

In the case that the vehicle computer 110 fails to receive the second user input selecting the first virtual button 300 prior to expiration of the timer, the vehicle computer 110 can reject the future updated operation. Additionally, or alternatively, the vehicle computer 110 can reject the future updated operation based on the second user input selecting the second virtual button 305. In this situation, the vehicle computer 110 can maintain operation of the vehicle 105. For example, the vehicle computer 110 can actuate one or more vehicle components 125 to maintain the vehicle 105, e.g., in a current lane, at a current speed, at a current following distance D, etc.

Figure 3B:
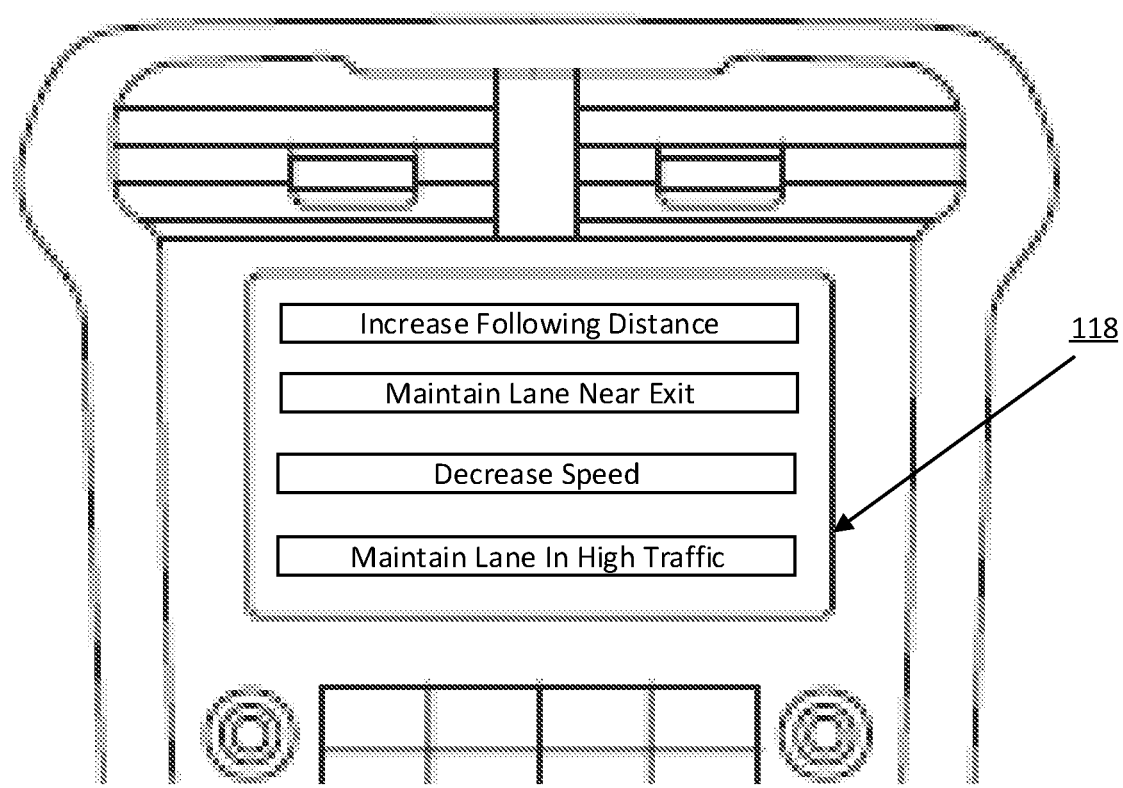
FIG. 3B is a diagram illustrating an example display representing a plurality of permitted operations.

Upon rejecting the future updated operation, the vehicle computer 110 can actuate the HMI 118 to display a respective representation for each of a plurality of permitted operations based on environmental conditions, as shown in FIG. 3B. For example, the HMI 118 can display one respective virtual button for each of the plurality of permitted operations. The HMI 118 can detect a third user input selecting one of the permitted operations, e.g., in substantially the same manner as discussed above with respect to the first user input, and can provide the selected permitted operation to the vehicle computer 110.

A permitted operation in the context of this document is an operation, other than the determined future updated operation, that the vehicle 105 can perform given the environmental conditions around the vehicle 105. Non-limiting examples of permitted operations include: maintain a current lane position within a specified distance of an exit, increase a following distance D when precipitation is detected, maintain a lane position when a traffic density is above a specified density, increase a gap threshold between vehicles 220, 225 to allow for a lane change, reduce a vehicle 105 speed at night, avoid a type of road 200, etc.

The vehicle computer 110 can reset and initiate the timer upon displaying the plurality of permitted operations. If the vehicle computer 110 fails to receive a third user input selecting a permitted operation prior to expiration of the timer, then the vehicle computer 110 can maintain operation of the vehicle, as discussed above. If the vehicle computer 110 receives the third user input selecting the permitted operation prior to expiration of the timer, then the vehicle computer 110 can operate the vehicle 105 based on the permitted operation. In this situation, the vehicle computer 110 can operate the vehicle 105 based on the permitted operation. For example, the vehicle computer 110 can actuate one or more vehicle components 125 to perform the permitted operation.

Additionally, the vehicle computer can determine updated operating parameters for the autonomous mode based on the selected permitted operation. For example, the vehicle computer 110 can input the selected permitted operation and/or environmental conditions into the DNN 400 that can be trained to accept the selected permitted operation and/or environmental conditions as input and generate an output of a determination of updated operating parameters for the autonomous mode.

The vehicle computer 110 can be programmed to transition the autonomous mode from the activated state to the deactivated state based on detecting a fourth user input deselecting the autonomous mode, e.g., in substantially the same manner as discussed above with respect to the first user input.

Additionally, or alternatively, the vehicle computer 110 may be programmed to transition the autonomous mode from the activated state to the deactivated state based on a user input to control vehicle operation. The vehicle 105 can receive the user input to control vehicle operation via a propulsion component 125 (e.g., an accelerator pedal), a brake component 125 (e.g., a brake pedal), and/or a steering component 125 (e.g., a steering wheel). That is, while the vehicle computer 110 is operating the vehicle 105 in the autonomous mode, the user can provide the user input to control vehicle operation via one or more vehicle components 125. Upon receiving the user input to control vehicle operation, the vehicle computer 110 can deactivate the autonomous mode. In this situation, the user controls operation of the vehicle 105.

The vehicle computer 110 can detect the user input to control vehicle operation based on sensor 115 data. For example, the vehicle computer 110 can detect actuation of a brake component 125 via a brake sensor 115, actuation of a steering component 125 via a steering sensor 115, and/or actuation of a propulsion component via an accelerator sensor 115. A brake sensor 115 can be any suitable type of sensor to measure movement of a brake pedal, including how much pressure is applied to the brake pedal. A steering sensor 115 can be any suitable type of sensor to measure movement of a steering wheel, including an angular velocity of the steering wheel. An accelerator sensor 115 can be any suitable type of sensor to measure movement of an accelerator pedal, including how much pressure is applied to the accelerator pedal.

The vehicle computer 110 can record a number of user inputs to control vehicle operation while the vehicle 105 is operating in the autonomous mode. That is, upon detecting a user input to control vehicle operation, the vehicle computer 110 can increment a counter, typically initialized to zero and counting in increments of one, that stores a number of counted instances of detected user inputs to control vehicle operation. For example, the vehicle computer 110 can store the number of user inputs to control vehicle operation, e.g., in a memory of the vehicle computer 110. The vehicle computer 110 can, for example, reset the number of user inputs to control vehicle operation after inputting the user inputs to control vehicle operation to the machine learning program, as discussed below.

The vehicle computer 110 can compare the number of user inputs to control vehicle operation to a threshold. The threshold can be determined based on, e.g., empirical testing to determine a minimum number of user inputs to control vehicle operation that indicate an identifiable pattern in vehicle operations (e.g., based on environmental conditions). The threshold may be stored, e.g., in a memory of the vehicle computer 110. When the number of user inputs to control vehicle operation is less than the threshold, the vehicle computer 110 maintains the operating parameters for the autonomous mode.

When the number of user inputs to control vehicle operation equals the threshold, the vehicle computer 110 updates the operating parameters for the autonomous mode. For example, the vehicle computer 110 can input the user input to control vehicle operation and/or environmental conditions into the DNN 400 that can be trained to accept the user input to control vehicle operation and/or environmental conditions as input and generate an output of a determination of updated operating parameters for the autonomous mode.

Upon determining the updated operating parameters, the vehicle computer 110 can compare one or more updated operating parameters to corresponding rules. The rules may be stored, e.g., in a memory of the vehicle computer 110. If the updated operating parameter(s) satisfies the corresponding rule(s), then the vehicle computer 110 can store the updated operating parameter(s), e.g., in a memory of the vehicle computer 110. If the updated operating parameter(s) fail to satisfy the corresponding rule(s), then the vehicle computer 110 can maintain the current operating parameter(s).

As one example, the vehicle computer can compare an updated following distance D to a minimum following distance rule. The minimum following distance rule may be determined based on, e.g., empirical testing to determine a minimum distance in which the vehicle computer 110 can stop the vehicle 105 (e.g., based on the speed of the vehicle 105, environmental conditions, etc.). In this example, upon determining that the updated following distance D is greater than or equal to the minimum following distance rule, the vehicle computer 110 determines that the current following distance D satisfies the rule. Conversely, upon determining that the updated following distance D is less than the minimum following distance rule, the vehicle computer 110 determines that the updated following distance D does not satisfy the rule.

After detecting the user input to control vehicle operation, the vehicle computer 110 can resume operation in autonomous mode, i.e., transition the autonomous mode back to the activated state, based on detecting an absence of the user input to control vehicle operation for predetermined time. As set forth above, the vehicle computer 110 can detect the user input to control vehicle operation based on sensor 115 data. Upon detecting an absence of the user input to control vehicle operation, i.e., when the sensor 115 data indicates that the user is not providing a user input to control vehicle operation via one or more vehicle components 125, the vehicle computer 110 can initiate a timer. The timer may have a predetermined duration, e.g., 1 second, 5 seconds, 10 seconds, etc. The predetermined duration may be determined based on, e.g., empirical testing to determine an average amount of time between user inputs to control vehicle operation. In the case that the vehicle computer 110 detects the absence of the user input to control vehicle operation for the duration of the timer, the vehicle computer 110 can transition the autonomous mode to the activated state. In the case that the vehicle computer 110 detects a user input to control vehicle operation prior to expiration of the timer, the vehicle computer 110 can maintain the autonomous mode in the deactivated state, i.e., continue to monitor vehicle operation in the nonautonomous mode.

Upon resuming vehicle operation in the autonomous mode, the vehicle computer 110 can operate the vehicle based on the updated operating parameters. For example, the vehicle computer 110 can access the updated operating parameters, e.g., from a memory of the vehicle computer 110. The vehicle computer 110 can then actuate one or more vehicle components 125 to operate the vehicle 105 while meeting the updated operating parameters. For example, the vehicle computer 110 can actuate vehicle components 125 to a speed, a following distance D from a lead vehicle 215, a lane 205 selection, a road 200 selection, etc., specified by the updated operating parameters.

Figure 4:
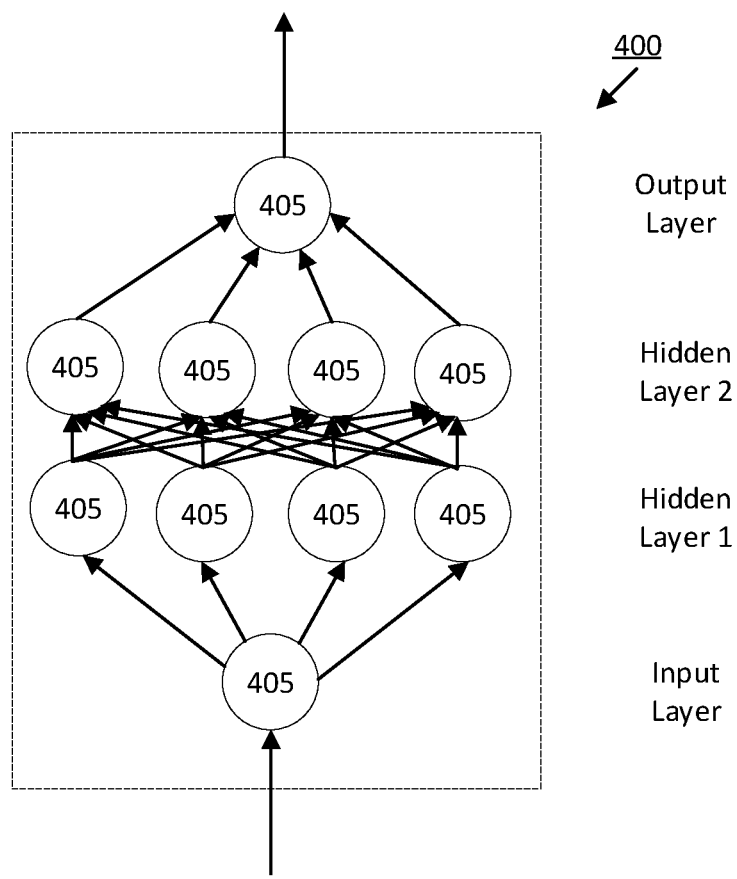
FIG. 4 is an example of a deep neural network.

FIG. 4 is a diagram of an example deep neural network (DNN) 400 that can be trained to determine operating parameters for an autonomous mode based on operation data, environmental conditions, selected permitted operations, and/or user inputs to control vehicle operation. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN includes multiple nodes, and the nodes are arranged so that the DNN 400 includes an input layer, one or more hidden layers, and an output layer. Each layer of the DNN 400 can include a plurality of nodes 405. While FIG. 4 illustrate three hidden layers, it is understood that the DNN 400 can include additional or fewer hidden layers. The input and output layers may also include more than one node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. For example, the DNN 400 can be trained with ground truth data and/or updated with additional data by a processor of the remote server computer 140. Weights can be initialized by using a Gaussian distribution, for example, and a bias for each node 405 can be set to zero. Training the DNN 400 can include updating weights and biases via suitable techniques such as back-propagation with optimizations. Ground truth data used for training can include, but is not limited to, data specifying user inputs that select a permitted operation after rejecting a future updated operation, user inputs to control vehicle operations, environmental conditions, and operation data.

During operation, the vehicle computer 110 obtains sensor 115 data of the environment around the vehicle 105 and of vehicle components 125. The vehicle computer 110 can provide the sensor 115 data, e.g., image data, operation data, etc., to the DNN 400. The DNN 400 generates an output based on the received input. The output is a determination of operating parameters (or updated operating parameters) for the autonomous mode. For example, the DNN 400 can output a maximum speed, a minimum following distance D, and/or a minimum gap G between vehicles 220, 225 in an adjacent lane 210 above which the vehicle computer 110 can perform a lane change based on the environmental conditions, e.g., the weather, a road type, road characteristics, a time of day, etc. Additionally, the DNN 400 can output a lane 205 in which to operate the vehicle 105 based on the environmental conditions, e.g., a distance to an exit, a traffic density, etc.

Figure 5A:
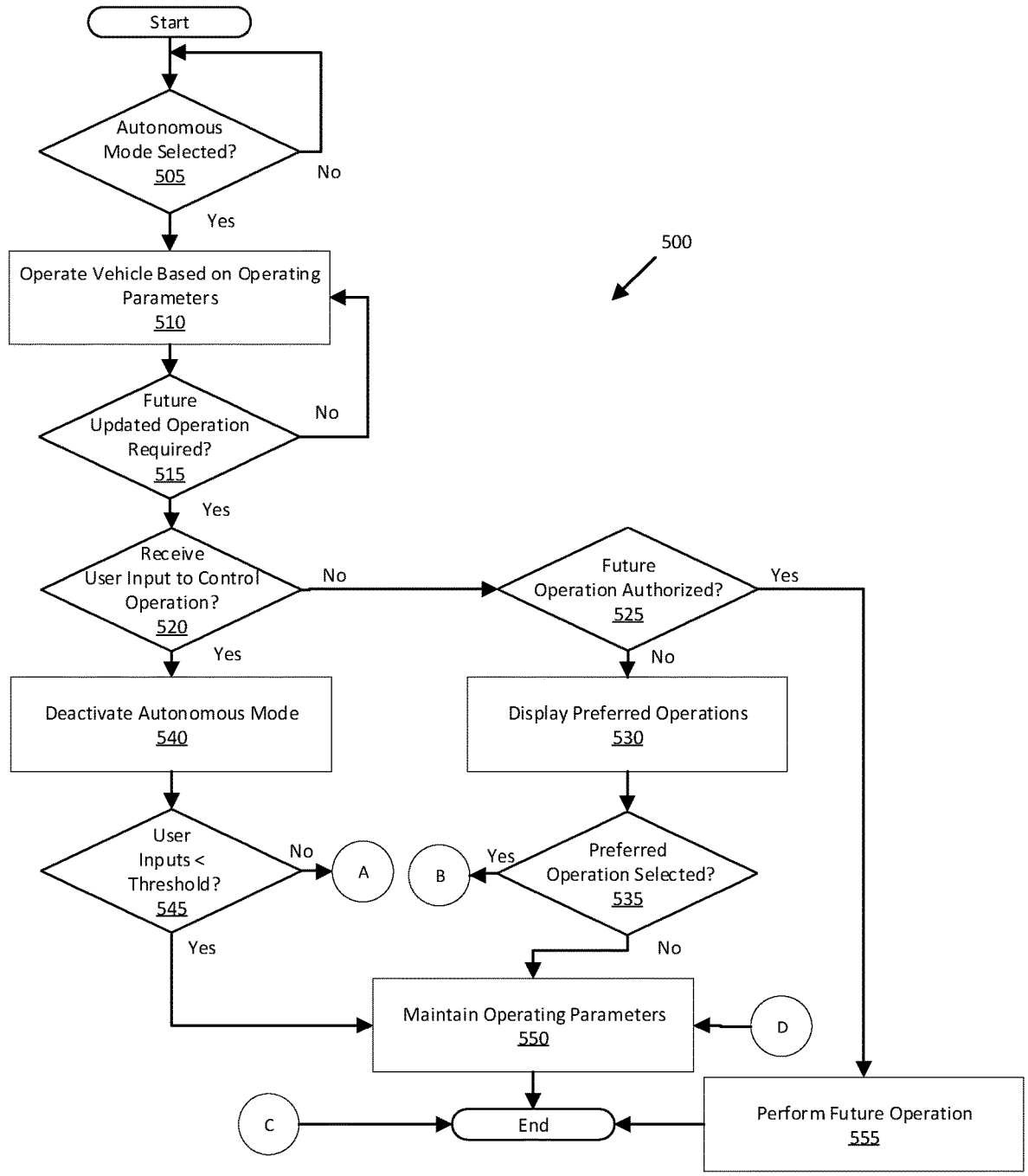
FIG. 5A is a first part of a flowchart of an example process for determining operating parameters for an autonomous mode.

FIG. 5A is a first portion of a flowchart of an example process 500 (the second portion being shown in FIG. 5B because the entire flowchart will not fit on a single drawing sheet) for determining operating parameters for an autonomous mode. The process 500 begins in a block 505. The process 500 can be carried out by a vehicle computer 110 included in the vehicle 105 executing program instructions stored in a memory thereof.

In the block 505, the vehicle computer 110 determines whether a user selected the autonomous mode. For example, the HMI 118 can display a virtual button and can activate sensors 115 that can detect a first user input selecting the virtual button to select the autonomous mode, as discussed above. Upon detecting the first user input, the HMI 118 can provide the first user input to the vehicle computer 110, and the vehicle computer 110 can activate the autonomous mode based on the first user input. If the autonomous mode is selected, then the process 500 continues in a block 510. Otherwise, the process 500 remains in a block 505.

In the block 510, the vehicle computer 110 operates the vehicle based on the operating parameters for the autonomous mode. For example, the vehicle computer 110 can actuate one or more vehicle components 125 to operate the vehicle 105 while meeting the operating parameters, as discussed above. Additionally, the vehicle computer 110 can generate a planned path to operate the vehicle 105 along a road 200 based on the operating parameters, e.g., to direct the vehicle 105 along specified types of roads, as discussed above. The process 500 continues in a block 515.

In the block 515, the vehicle computer 110 determines whether a future updated operation is required based on the operating parameters and/or environmental conditions. For example, the vehicle computer 110 can determine to update a vehicle 105 speed and/or a following distance D from a lead vehicle 215 in front of the vehicle 105 to correspond with the operating parameters, as discussed above. As another example, the vehicle computer 110 can determine to update the planned path, e.g., to change lanes, to correspond with the operating parameters, as discussed above. Upon determining the future updated operation, the vehicle computer 110 can actuate the HMI 118 to display a representation of the future updated operation, as discussed above. If the vehicle computer 110 determines a future updated operation, then the process 500 continues in a block 520. Otherwise, the process 500 returns to the block 510.

In the block 520, the vehicle computer 110 determines whether a user input to control vehicle operation is received. The vehicle 105 can receive the user input to control vehicle operation via one or more vehicle components 125, as discussed above. The vehicle computer 110 can detect the user input to control vehicle operation based on sensor 115 data, as discussed above. If the vehicle computer 110 detects a user input to control vehicle operation, then the process 500 continues in a block 540. Otherwise, the process 500 continues in a block 525.

In the block 525, the vehicle computer 110 determines whether the future updated operation displayed in the block 515 has been authorized by user input. In addition to the representation of the future updated operation, the HMI 118 can display a first virtual button 300 and a second virtual button 305. The HMI 118 can detect a second user input selecting the one of the first virtual button 300 or the second virtual button 305, and can provide detected the second user input to the vehicle computer 110, as discussed above. Additionally, the vehicle computer 110 can initiate a timer upon displaying the representation of the future updated operation, as discussed above. If the vehicle computer 110 receives the second user input selecting the first virtual button 300 prior to expiration of the timer, the vehicle computer 110 can authorize the future updated operation. If the vehicle computer 110 fails to receive the second user input selecting the first virtual button 300 prior to expiration of the timer, the vehicle computer 110 can reject the future updated operation. Additionally, or alternatively, the vehicle computer 110 can reject the future updated operation based on the second user input selecting the second virtual button 305. If the vehicle computer 110 authorizes the future updated operation, then the process 500 continues in a block 560. Otherwise, the process 500 continues in a block 530.

In the block 530, the vehicle computer 110 displays a respective representation of a plurality of permitted operations based on environmental conditions. As set forth above, a permitted operation is an operation, other than the determined future updated operation, that the vehicle 105 can perform given the environmental conditions around the vehicle 105. For example, the vehicle computer 110 can actuate the HMI 118 to display one respective virtual button for each of the plurality of permitted operations. The process 500 continues in a block 535.

In the block 535, the vehicle computer 110 determines whether a permitted operation is selected. The HMI 118 can detect a third user input selecting one of the permitted operations and can provide the selected permitted operation to the vehicle computer 110, as discussed above. Additionally, the vehicle computer 110 can reset and initiate the timer upon displaying the plurality of permitted operations. If the vehicle computer 110 receives the third user input selecting the permitted operation prior to expiration of the timer, then the process 500 continues in a block 575. Otherwise, the process 500 continues in a block 550.

In the block 540, the vehicle computer 110 deactivates the autonomous mode. That is, the vehicle computer 110 transitions the autonomous mode from the activated state to the deactivated state. In this situation, the vehicle computer 110 monitors vehicle 105 operation in the nonautonomous mode. The process 500 continues in a block 545.

In the block 545, the vehicle computer 110 compares a number of user inputs that have been received to control vehicle operation to a threshold. The vehicle computer 110 can record a number of user inputs to control vehicle operation while the vehicle 105 is operating in the autonomous mode, as discussed above. If the number of user inputs to control vehicle operation is less than the threshold, process 500 continues in a block 550. Otherwise, the process 500 continues in a block 560.

In the block 550, the vehicle computer 110 maintains the operating parameters for the autonomous mode. Additionally, the vehicle computer 110 maintains operation of the vehicle 105. For example, the vehicle computer 110 can actuate one or more vehicle components 125 to operate the vehicle 105 while meeting the current operating parameters. As discussed above, the vehicle computer 110 can determine operating parameters for the autonomous mode based on, e.g., inputting operation data and/or environmental conditions into a neural network, such as the DNN 400 described above, that can then generate an output of a determination of operating parameters for the autonomous mode. The process 500 ends following the block 550.

In the block 555, the vehicle computer 110 operates the vehicle 105 based on the future updated operation. For example, the vehicle computer 110 can actuate one or more vehicle components 125 to perform the future updated operation. The process 500 ends following the block 555.

Figure 5B:
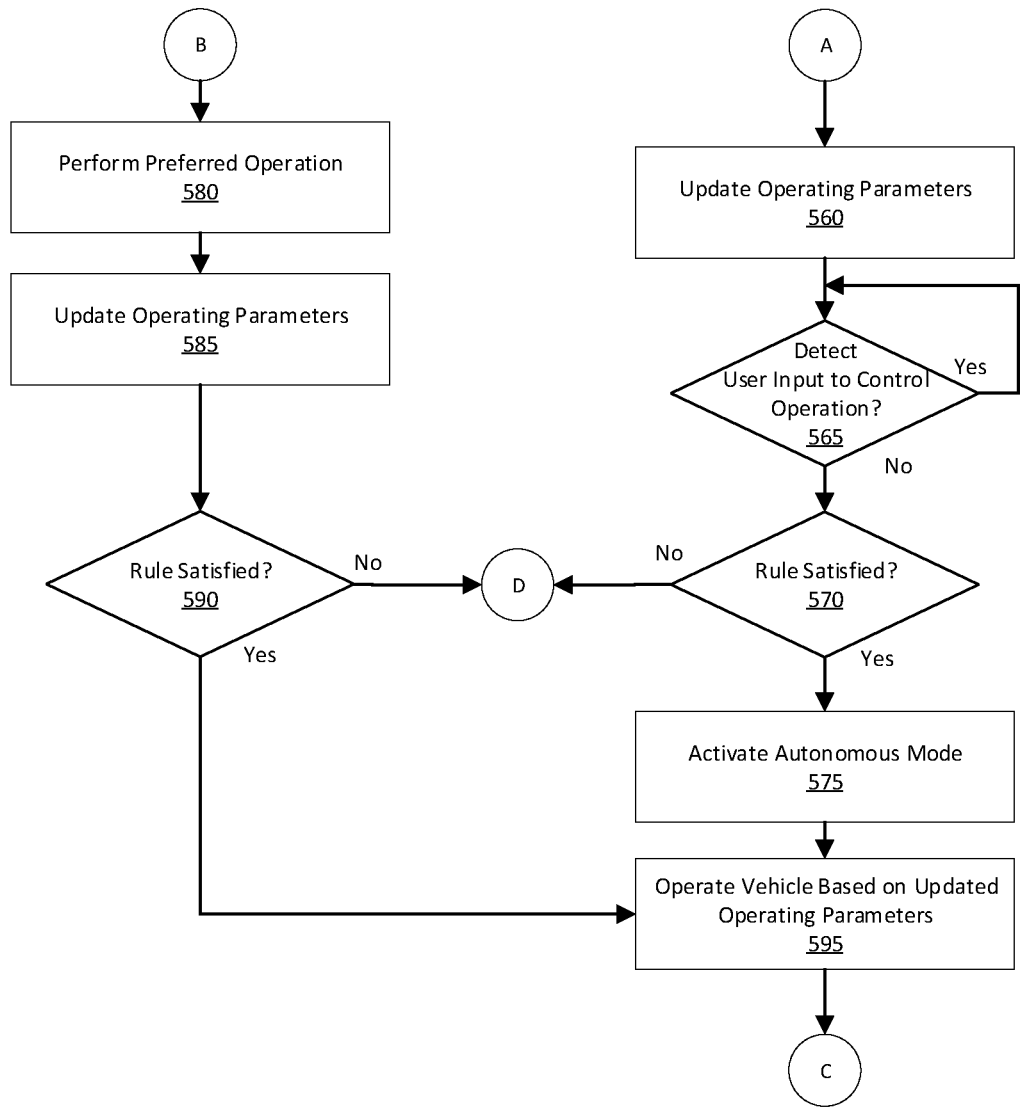
FIG. 5B is a second part of the flowchart of FIG. 5A.

Turning now to FIG. 5B, following the block 545 shown in FIG. 5A, in the block 560, the vehicle computer 110 updates the operating parameters for the autonomous mode. For example, the vehicle computer 110 can input the user input to control vehicle operation and/or environmental conditions into the neural network. The neural network can then generate an output of a determination of updated operating parameters for the autonomous mode based on the input. The process 500 continues in a block 565.

In the block 565, the vehicle computer 110 determines whether a user input to control vehicle operation is received within a predetermined time. After detecting the user input to control vehicle operation in the block 520, the vehicle computer 110 can initiate a timer upon detecting an absence of the user input to control vehicle operation, as discussed above. If the vehicle computer 110 detects the absence of the user input to control vehicle operation for the duration of the timer, then the process 500 continues in a block 570. Otherwise, the process 500 remains in the block 565.

In the block 570, the vehicle computer 110 determines whether one or more updated operating parameters satisfy corresponding rules. The vehicle computer 110 can compare the updated operating parameter(s) to corresponding rule(s), as discussed above. If the updated operating parameter(s) satisfies the corresponding rule(s), then the process 500 continues in a block 575. Otherwise, the process 500 continues in the block 550.

In the block 575, the vehicle computer 110 resumes operation in the autonomous mode. That is, the vehicle computer 110 transitions the autonomous mode from the deactivated state to the activated state. The process 500 continues in a block 595.

In the block 580, following the block 535 shown in FIG. 5A, the vehicle computer 110 operates the vehicle 105 based on the selected permitted operation. For example, the vehicle computer 110 can actuate one or more vehicle components 125 to perform the selected permitted operation. The process 500 continues in a block 585.

In the block 585, the vehicle computer 110 updates the operating parameters for the autonomous mode. The block 585 is substantially the same as the block 560 of process 500 except that in the block 585 the vehicle computer 110 inputs the selected permitted operation into the neural network instead of the user input to control vehicle operation. The block 585 will not be described further to avoid redundancy. The process 500 continues in a block 590.

In the block 590, the vehicle computer 110 determines whether one or more updated operating parameters satisfy corresponding rules. The block 580 is substantially the same as the block 575 of process 500 and therefore will not be described further to avoid redundancy. The process 500 continues in a block 595.

In the block 595, the vehicle computer 110 operates the vehicle 105 based on the updated operating parameters. For example, the vehicle computer 110 can then actuate one or more vehicle components 125 to operate the vehicle 105 while meeting the updated operating parameters. The process 500 ends following the block 595.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   while an autonomous mode is activated, operate a vehicle based on operating parameters for the autonomous mode, wherein the operating parameters include at least one of a vehicle speed or a following distance;
   upon detecting a user input to control vehicle operation via at least one of a steering component, a braking component, or a propulsion component, transition to a nonautonomous mode and increment a count of a number of received user inputs to control the vehicle operation;
   upon determining that the count of the number of the received user inputs to control the vehicle operation is greater than a threshold, update the operating parameters for the autonomous mode; and
   then, upon determining to transition from the nonautonomous mode to the autonomous mode, operate the vehicle based on the updated operating parameters,
   wherein the instructions further include instructions to determine the operating parameters based on operation data obtained while monitoring the vehicle in the nonautonomous mode,
   wherein the instructions further include instructions to input the operation data to a machine learning program that outputs the operating parameters, and
   wherein the instructions further include instructions to, upon determining a future updated operation based on the operating parameters, maintain the vehicle operation in a current autonomous mode based on receiving, within a predetermined time, a second user input via a display rejecting the future updated operation.

2. The system of claim 1, wherein the instructions further include instructions to determine the operating parameters additionally based on environmental conditions.

3. The system of claim 2, wherein the instructions further include instructions to input the operation data and the environmental conditions to the machine learning program that outputs the operating parameters.

4. The system of claim 1, wherein the instructions further include instructions to, upon receiving the second user input rejecting the future updated operation, update a display to provide a respective representation for each of a plurality of permitted operations based on environmental conditions.

5. The system of claim 1, wherein the instructions further include instructions to, upon failing to receive the second user input rejecting the future updated operation within the predetermined time, operate the vehicle based on the future updated operation.

6. The system of claim 1, wherein the instructions further include instructions to, upon receiving a third user input specifying a permitted operation, operate the vehicle based on the permitted operation.

7. The system of claim 6, wherein the instructions further include instructions to, upon receiving the third user input specifying the permitted operation, input the third user input specifying the permitted operation to the machine learning program that outputs the updated operating parameters.

8. The system of claim 1, wherein the instructions to update the operating parameters further include instructions to, upon determining that the count of the number of the user inputs is greater than the threshold, input the user input to the machine learning program that outputs the updated operating parameters.

9. The system of claim 1, wherein the instructions further include instructions to:
   upon determining that the count of the number of the user inputs to control the vehicle operation is less than or equal to the threshold, maintain the operating parameters for the autonomous mode; and
   then, upon determining to transition from the nonautonomous mode to the autonomous mode, operate the vehicle based on the operating parameters.

10. The system of claim 1, wherein the instructions further include instructions to determine to transition to the autonomous mode based on detecting an absence of the user input to control the vehicle operation for a predetermined time.

11. A method, comprising:
    while an autonomous mode is activated, operating a vehicle based on operating parameters for the autonomous mode, wherein the operating parameters include at least one of a vehicle speed or a following distance;
    upon detecting a user input to control vehicle operation via at least one of a steering component, a braking component, or a propulsion component, transitioning to a nonautonomous mode and incrementing a count of a number of received user inputs to control the vehicle operation;
    upon determining that the count of the number of the received user inputs to control the vehicle operation is greater than a threshold, updating the operating parameters for the autonomous mode; and
    then, upon determining to transition from the nonautonomous mode to the autonomous mode, operating the vehicle based on the updated operating parameters,
    further comprising determining the operating parameters based on operation data obtained while monitoring the vehicle in the nonautonomous mode,
    further comprising inputting the operation data to a machine learning program that outputs the operating parameters, and
    further comprising, upon determining a future updated operation based on the operating parameters, maintaining the vehicle operation in a current autonomous mode based on receiving, within a predetermined time, a second user input via a display rejecting the future updated operation.

12. The method of claim 11, further comprising, upon receiving a third user input specifying a permitted operation, operating the vehicle based on the permitted operation.

13. The method of claim 11, further comprising:
    upon determining that the count of the number of the user inputs to control the vehicle operation is less than or equal to the threshold, maintaining the operating parameters for the autonomous mode; and
    then, upon determining to transition from the nonautonomous mode to the autonomous mode, operating the vehicle based on the operating parameters.

14. The method of claim 11, further comprising determining to transition to the autonomous mode based on detecting an absence of the user input to control the vehicle operation for a predetermined time.

* * * * *